United States Patent
Morishita et al.

(10) Patent No.: US 10,410,624 B2
(45) Date of Patent: Sep. 10, 2019

(54) TRAINING APPARATUS, TRAINING METHOD, AND COMPUTER PROGRAM PRODUCT

(71) Applicant: KABUSHIKI KAISHA TOSHIBA, Tokyo (JP)

(72) Inventors: Terufumi Morishita, Kanagawa (JP); Takashi Masuko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/388,397

(22) Filed: Dec. 22, 2016

(65) Prior Publication Data

US 2017/0270911 A1 Sep. 21, 2017

(30) Foreign Application Priority Data

Mar. 17, 2016 (JP) .................................. 2016-054160

(51) Int. Cl.
*G10L 15/06* (2013.01)
*G10L 15/02* (2006.01)
(Continued)

(52) U.S. Cl.
CPC .......... *G10L 15/063* (2013.01); *G06N 3/0454* (2013.01); *G10L 15/02* (2013.01);
(Continued)

(58) Field of Classification Search
USPC ................................. 704/202, 231, 232, 259
See application file for complete search history.

(56) References Cited

U.S. PATENT DOCUMENTS 9,678,664 B2 * 6/2017 Zhai ...................... G06F 3/0219
9,715,660 B2 * 7/2017 Parada San Martin ..................... G06N 3/0454
(Continued)

FOREIGN PATENT DOCUMENTS

| JP | 6-28392 | 2/1994 |
| JP | 4245530 | 3/2009 |

(Continued)

OTHER PUBLICATIONS

Bengio et al.; "A Neural Probabilistic Language Model", Journal of Machine Learning Research, vol. 3, pp. 1137-1155, (2003).
(Continued)

*Primary Examiner* — Leonard Saint Cyr
(74) *Attorney, Agent, or Firm* — Finnegan, Henderson, Farabow, Garrett & Dunner, L.L.P.

(57) ABSTRACT

According to an embodiment, a training apparatus includes a converting unit to convert each input word into a vocabulary feature thereof based on a first probability associated with the input word, to acquire an input training word indicating the input word or the vocabulary feature, and convert, when an input training word string including input training words is input to an input layer of a neural network, an output word expected to be output from an output layer of the neural network into a vocabulary feature of the output word based on a second probability associated with the output word, to acquire an output training word indicating the output word or a vocabulary feature thereof; and a training unit to train the neural network based on a difference between an expected score of the output training word and a score output from a unit corresponding to the output training word.

11 Claims, 9 Drawing Sheets

(51) Int. Cl.
  *G10L 15/14* (2006.01)
  *G10L 15/16* (2006.01)
  *G10L 25/30* (2013.01)
  *G06N 3/04* (2006.01)

(52) U.S. Cl.
  CPC .............. *G10L 15/14* (2013.01); *G10L 15/16* (2013.01); *G10L 25/30* (2013.01)

(56) References Cited

U.S. PATENT DOCUMENTS

| | | |
|---|---|---|
| 2001/0053974 A1 | 12/2001 | Lucke et al. |
| 2004/0167779 A1 | 8/2004 | Lucke et al. |
| 2015/0019204 A1* | 1/2015 | Simard ............... G06F 17/2785 704/9 |
| 2015/0095017 A1 | 4/2015 | Mnih et al. |
| 2015/0127594 A1* | 5/2015 | Parada San Martin ...................... G06N 3/0454 706/16 |
| 2015/0220833 A1* | 8/2015 | Le ............................ G06N 3/04 706/16 |
| 2015/0340032 A1* | 11/2015 | Gruenstein ............. G10L 15/16 704/232 |
| 2016/0217367 A1* | 7/2016 | Moreno ................... G10L 15/16 |
| 2016/0299685 A1* | 10/2016 | Zhai ...................... G06F 3/0219 |
| 2016/0350655 A1* | 12/2016 | Weiss ..................... G06N 3/088 |
| 2017/0092262 A1* | 3/2017 | Pinhasi ................... G10L 15/02 |

FOREIGN PATENT DOCUMENTS

| | | |
|---|---|---|
| JP | 4543294 | 9/2010 |
| JP | 2015-75706 | 4/2015 |

OTHER PUBLICATIONS

Mikolov et al.; "Recurrent Neural Network Based Language Model", Interspeech, pp. 1045-1048, (2010).

\* cited by examiner

TRAINING APPARATUS, TRAINING METHOD, AND COMPUTER PROGRAM PRODUCT

CROSS-REFERENCE TO RELATED APPLICATIONS

This application is based upon and claims the benefit of priority front Japanese Patent Application No. 2016-054160, filed on Mar. 17, 2016; the entire contents of which are incorporated herein by reference.

FIELD

Embodiments described herein relate generally to a training apparatus, a training method, and a computer program product.

BACKGROUND

Conventionally known is a technology that, given a word string, calculates a word score of a word at a specific position in the word string. Having been developed recently is a technology for calculating the word score using a neural network.

Also conventionally known is a training method for a neural network capable of calculating the word score. In such a conventional training method, the training apparatus, to begin with, converts each text making up a part or the entire training text corpus into a word string that includes a plurality of words by performing morphological analysis of the text. The training apparatus then selects an exemplary word to be input to the neural network, and an exemplary word to be output correspondingly to the exemplary input, from the word string. The training apparatus then actually inputs the exemplary input to the neural network, and acquires the result output from the neural network. The training apparatus then updates neural network parameters based on the difference between the selected exemplary output and the actual output result from the neural network.

DETAILED DESCRIPTION

According to an embodiment, a training apparatus includes a dividing unit, a converting unit, a calculating unit, and a training unit. The dividing unit divides an input character string to be input to an input layer of a neural network to be trained into a plurality of input words. The converting unit converts each of the input words into a vocabulary feature of the input word based on a first probability associated with the input word, to acquire an input training word indicating the input word or the vocabulary feature of the input word, and converts, when an input training word string including a plurality of input training words is input to the input layer, an output word expected to be output from an output layer of the neural network into a vocabulary feature of the output word based on a second probability associated with the output word, to acquire an output training word indicating the output word or the vocabulary feature of the output word. The calculating unit inputs the input training word string to the input layer of the neural network, to acquire a score output from a unit included in the output layer of the neural network. The training unit trains the neural network based on a difference between an expected score of the output training word and a score output from a unit corresponding to the output training word.

An embodiment will now be explained in detail with reference to the accompanying drawings.

Functional Configuration of Training Apparatus

To begin with, an exemplary functional configuration of a training apparatus according to the embodiment will be explained.

Figure 1:
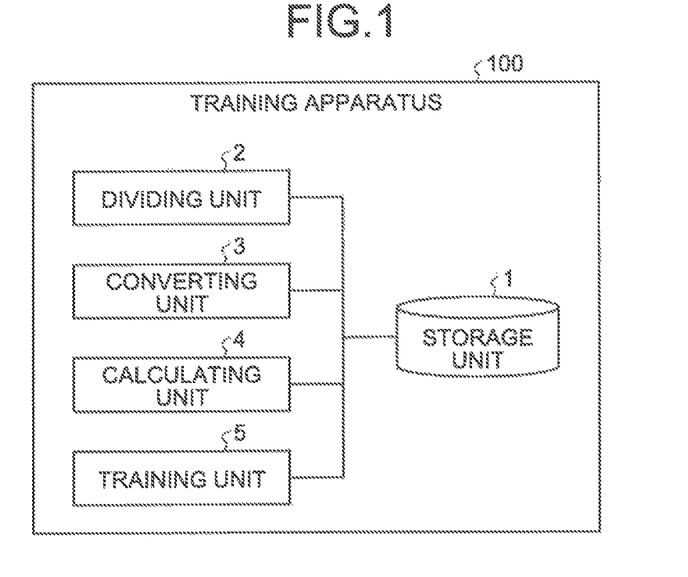
FIG. 1 is a schematic illustrating an exemplary functional configuration of a training apparatus according to an embodiment.

FIG. 1 is a schematic illustrating an exemplary functional configuration of a training apparatus 100 according to the embodiment. The training apparatus 100 according to the embodiment includes a storage unit 1, a dividing unit 2, a converting unit 3, a calculating unit 4, and a training unit 5.

The storage unit 1 stores therein information. The storage unit 1 stores therein information such as a word list, a known-word dictionary, a new-word dictionary, a training text corpus, a neural network to be described later (see FIG. 3), and conversion probability information which is also to be described later (see FIG. 4).

A word list is a list of words. Hereinafter, a word list is referred to as a vocabulary. A word included in a vocabulary is referred to as a known word. A word not included in the vocabulary is referred to as a new word.

The known-word dictionary stores therein known words that are already known, in a manner associated with their vocabulary features. Known words are words that are generally well-known such as those registered in Japanese dictionaries or the like. A vocabulary feature is a type of a set into which words are classified based on some standard. An example of the vocabulary feature is the word class of a word. Another example of the vocabulary feature is a name given to a set of words that are classified by their similarity. The words are not limited to those in a natural language but include symbols and the like.

The new-word dictionary stores therein new words in a manner associated with their vocabulary features. The new-word dictionary enables the training apparatus 100 to handle an unknown word as a new word. An unknown new word is added to the new-word dictionary as a new word anytime by a user, for example.

Used in explaining the embodiment is an example in which the vocabulary feature of a word is a word class.

The training text corpus stores therein word strings that are used for training a neural network used for calculating a word score.

Example of Word Score

To begin with, an exemplary word score will be explained using a simple example. A word score is calculated for a target word included in a character string. Specifically, the word score of a target word is calculated based on a conditional probability with the words other than the target words given as the conditions in the word string.

Figure 2:
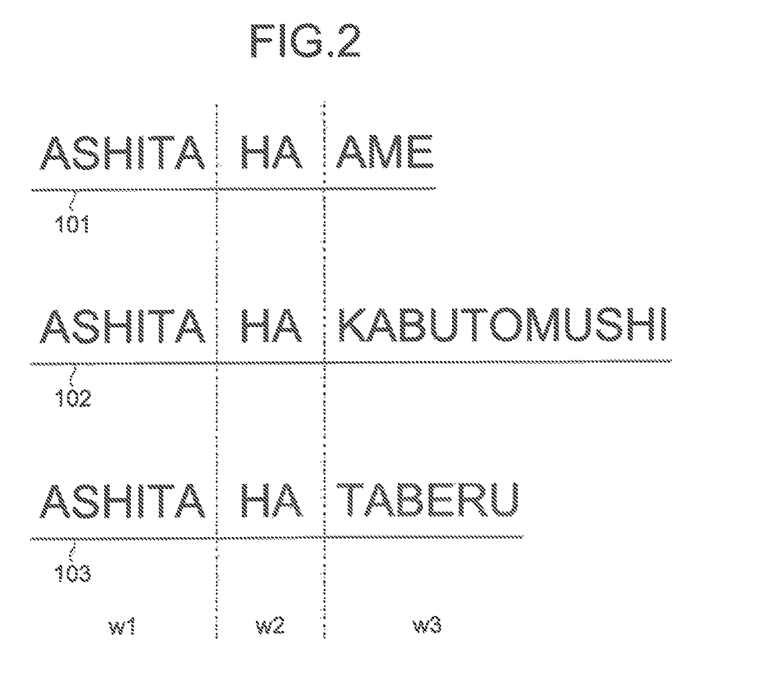
FIG. 2 is a schematic for explaining an exemplary word score calculation.

FIG. 2 is a schematic for explaining an exemplary word score calculation. In the example illustrated in FIG. 2, the word score of a target word w3 included in each of word strings 101 to 103 is calculated. The target word w3 in the word string 101 is the Japanese word "AME" which means "rain" in English. The target word w3 in the word string 102 is the Japanese word "KABUTOMUSHI" which means "beetle" in English. The target word w3 in the word string 103 is the Japanese word "TABERU" which means "eat" in English.

The words other than the target word are the word w1 "ASHITA" and the word w2 "HA". The target word w1 "ASHITA" means "tomorrow" in English. The target word w2 "HA" is a postpositional particle in Japanese grammar. With these given, a word score P1 in the word string 101, a word score P2 in the word string 102, and a word score P3 in the word string 103 are calculated using following Equations (1) to (3).

$$P1(w3=AME|w1=ASHITA, w2=HA)=0.3 \quad (1)$$

$$P2(w3=KABUTOMUSHI|w1=ASHITA, w2=HA)=0.1 \quad (2)$$

$$P3(w3=TABERU|w1=ASHITA, w2=HA)=0.2 \quad (3)$$

In the example in Equations (1) to (3), the word string 101 has the highest word score. Therefore, when the word strings 101 to 103 are acquired as possible recognition results from a voice recognition system, for example, it is most likely that the recognition result is the word string 101, from, a linguistic viewpoint.

Structure of Neural Network

Specifically, the calculating unit 4 calculates the word score of a target word included in a word string using a neural network.

A structure of the neural network to be trained will now be explained.

Figure 3:
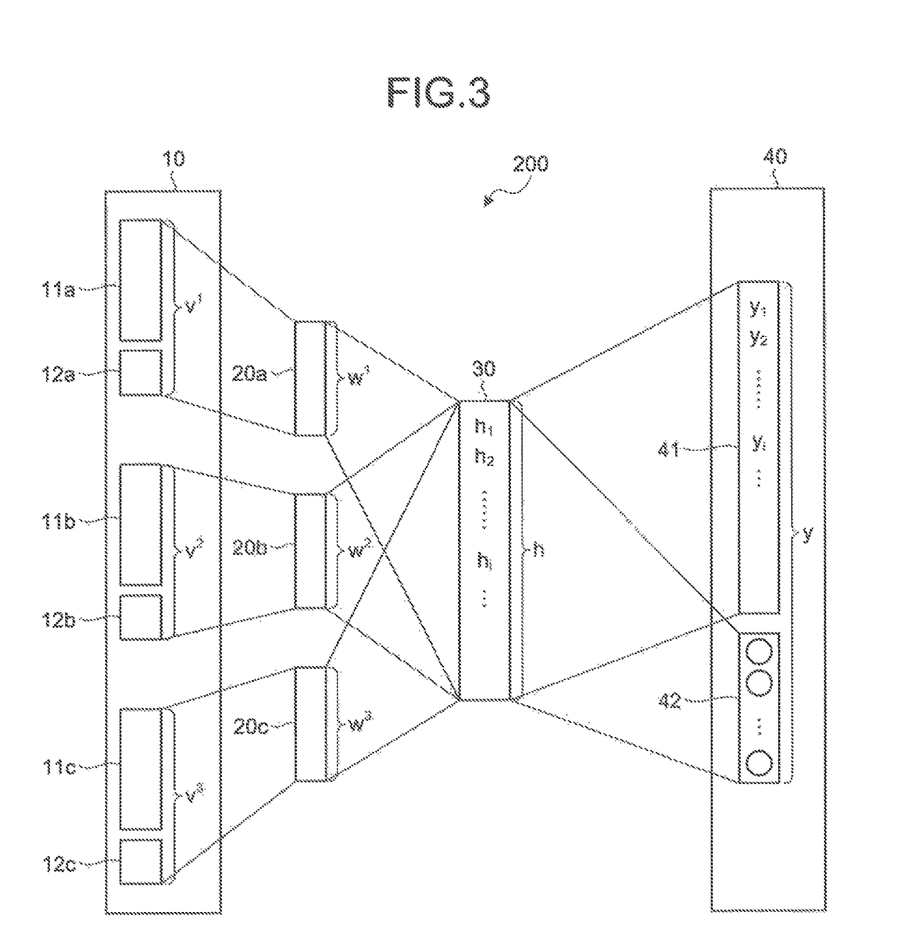
FIG. 3 is a schematic illustrating an exemplary neural network according to the embodiment.

FIG. 3 is a schematic illustrating an example of a neural network 200 according to the embodiment. To simplify, illustrated in the example in FIG. 3 is a structure assuming that the word score of a target word is calculated based on three words preceding the target word. The number of words used in calculating the word score of the target word may be any number. For example, the word score of the target word may be calculated based on five words preceding the target word.

The neural network 200 according to the embodiment includes an input layer 10, intermediate layers 20a to 20c, an intermediate layer 30, and an output layer 40. Hereinafter, when the intermediate layers 20a to 20c are not distinguished, the intermediate layers 20a to 20c will be simply referred to as intermediate layers 20. In the example illustrated in FIG. 3, the neural network 200 has two layers including the intermediate layers 20 and the intermediate layer 30, but the number of intermediate layers may be any number.

The input layer 10 includes word unit groups 11a to 11c, and word-class unit groups 12a to 12c. Hereinafter, when the word, unit groups 11a to 11c are not distinguished, the word unit groups 11a to 11c will foe referred to as word unit groups 11. In the same manner, when the word-class unit groups 12a to 12c are not distinguished, the word-class unit groups 12a to 12c will be simply referred to as word-class unit groups 12. Each of the word unit groups 11 includes one or more word units. In the same manner, each of the word-class unit groups 12 includes one or more word-class units.

To begin with, the calculating unit 4 inputs three pieces of input information preceding the target word to the input layer 10.

Specifically, if the first piece of input information previous to the target word is a word, the calculating unit 4 inputs the word to the word unit group 11a. If the first piece of input information previous to the target word is a word class, the calculating unit 4 inputs the word class to the word-class unit group 12a.

If the second piece of input information previous to the target word is a word, the calculating unit 4 inputs the word to the word unit group 11b. If the second piece of input information previous to the target word is a word class, the calculating unit 4 inputs the word class to the word-class unit group 12b.

If the third piece of input information previous to the target word is a word, the calculating unit 4 inputs the word to the word unit group 11c. If the third piece of input information previous to the target word is a word class, the calculating unit 4 inputs the word class to the word-class unit group 12c.

The calculating unit 4 may input a word to the word unit group 11 in any way. For example, the calculating unit 4 inputs a vector for identifying a word determined in advance for each word, to the corresponding word unit group 11. The vector for identifying a word may be determined as appropriate. The vector for identifying a word is, for example, a vector with a corresponding one component set to one, and all the other components set to zero, an example of which is (0, 0, 0, . . . , 0, 1, 0, . . . , 0, 0, 0). In this example, each component in the vector corresponds to a unit included in the word unit group 11. The unit to which one is input is referred to as an activated unit.

In the same manner, the calculating unit 4 may input a word class to the word-class unit group 12 in any way. For example, the calculating unit 4 inputs a vector for identifying a word class determined in advance for each word class, to the corresponding word-class unit group 12.

Hereinafter, a column vector acquired by concatenating a vector input to the word unit group 11 in the input layer 10, and a vector input to the word-class unit group 12, in the vertical direction will be referred to as a word vector $v^k$ ($k=1, 2, 3$).

The calculating unit 4 then applies a linear operation using Equation (4) below to the word vector $v^k$ ($k=1, 2, 3$) in the input layer 10, and inputs the resultant vector $v^k$ ($k=1, 2, 3$) to the intermediate layer 20.

$$w^k = W v^k \quad (4)$$

In Equation (4), W denotes a matrix representing the parameters indicating the concatenation weight of the word vector $v^k$.

The calculating unit 4 then performs the operation of following Equation (5) on the vector $w^k$ (k=1, 2, 3) in the intermediate layer 20, and inputs the resultant vector h to the intermediate layer 30.

$$h_i = \tan h[(SW+u)_i] \qquad (5)$$

In Equation (5), i denotes the i-th component of the vector h. w denotes the column vector acquired by concatenating the vector $w^k$ (k=1, 2, 3) of the intermediate layer 20 in a vertical direction. S denotes a matrix representing a parameter indicating the concatenation weight of the vector w. u denotes a threshold parameter of the intermediate layer 30. tan h denotes a hyperbolic tangent function.

In other words, the vector h is acquired by performing a linear operation on the vector w, and applying a hyperbolic tangent function thereto.

The calculating unit 4 then performs a linear operation of following Equation (6) on the vector h in the intermediate layer 30, and then performs a softmax operation of following Equation (7) on the resultant vector a. The calculating unit 4 then inputs the resultant vector y to the output layer 40.

$$a = Th + r \qquad (6)$$

$$y_i = \exp(a_i)/\Sigma_j \exp(a_j) \qquad (7)$$

In the equations, T denotes a matrix representing a parameter indicating the concatenation weight of the vector h. r denotes a threshold parameter of the output layer 40. i denotes the i-th component in the vector y and the vector a. j denotes the j-th component in the vector a. exp denotes an exponential function.

The output layer 40 includes a word score unit group and a word-class score unit group 42. The word score unit group 41 includes one or more word score units. Each of the word score units represents the score of a word (known word) that is already known. The word-class score unit group 42 includes one or more word-class score units. Each of the word-class score units represents the score of a word class. Examples of the word class include verb, noun, and adjective.

By using the neural network 200 having the structure described above, the calculating unit 4 can calculate a word score of a target word even, when a word string including a word and a word class is given to the input layer 10.

Specifically, a value $y_i$ in the output layer 40 corresponding to a target word $s_i$ represents a word score P $(s_i|v^1, v^2, v^3)$ of the target word $s_i$. Even when the target word $s_i$ is a word class, the calculating unit 4 can calculate the score of the word class because the output layer 40 has the word-class score unit group 42.

The neural network 200 illustrated in FIG. 3 is a feed-forward neural network, but may be a neural network having another structure. The neural network 200 may be a recurrent neural network, for example.

Usage Example of Neural Network

By using the neural network 200 described above, the calculating unit 4 can calculate the word score of the target word, even when a new word is included in the word string. Specifically, when, the word is a known word, the calculating unit 4 inputs the known word to the word unit group 11. If the word is a new word, the calculating unit 4 inputs the word class of the new word to the word-class score unit group 12. If the target word $s_i$ is a new word, the calculating unit 4 calculates the score of the word class matching the word class of the new word, as the word score of the new word.

Training of Neural Network

A training process of the neural, network 200 will now be explained.

Referring back to FIG. 1, the dividing unit 2 divides an input character string input to the input layer 10 of the neural network 200 to be trained into a plurality of input words by performing the morphological analysis of the input character string. For example, when, the word string 101 (see FIG. 2) is stored in the training text corpus, the input words will be the word, w1 "AHITA" and the word w2 "HA".

The converting unit 3 then converts each of the input words into a word class of the input word based on the probability associated with the input word, so as to acquire an input training word that indicates an input word or the word class of the input word.

The converting unit 3 converts an output word that is expected to be output from the output layer 40 of the neural network 200, when an input training word, string including the input training words is input to the input layer 10, into the word class of the output word, based on the probability associated with the output word, so as to acquire an output training word that indicates an output word or the word class of the output word.

Figure 4:
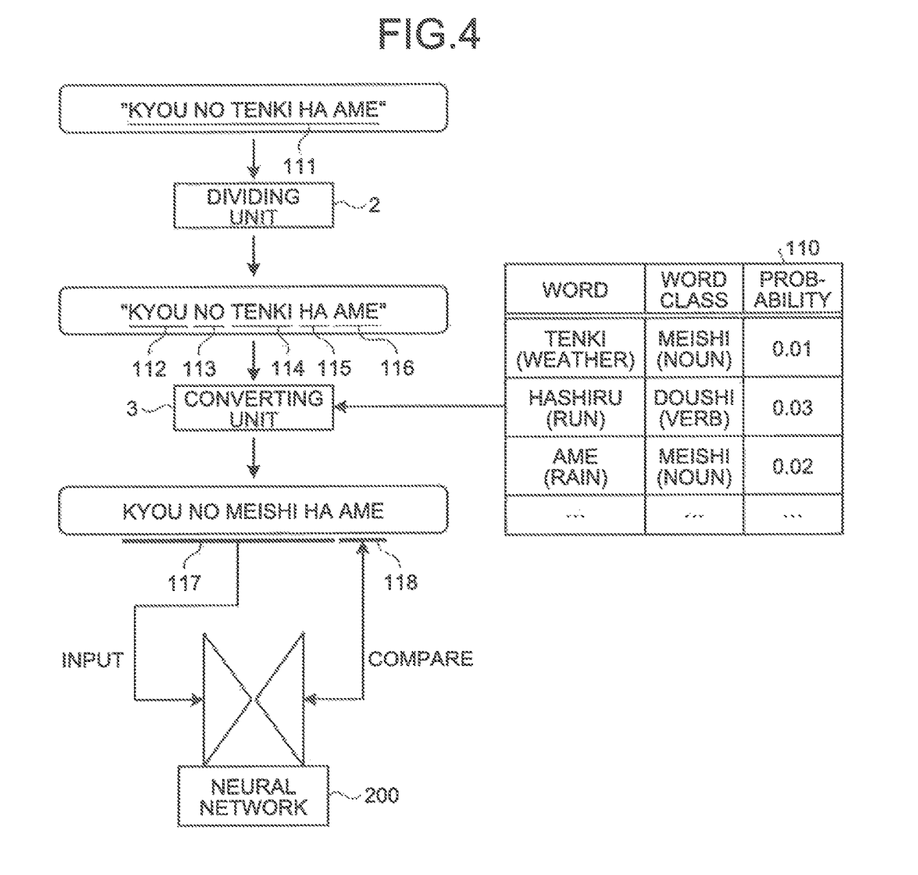
FIG. 4 is a schematic illustrating an example of a process performed by a dividing unit and a converting unit according to the embodiment.

FIG. 4 is a schematic illustrating an example or the process performed by the dividing unit 2 and the converting unit 3. Illustrated in the example in FIG. 4 is an example in which the dividing unit 2 has acquired a character string 111 from the training text corpus stored in the storage unit 1. The dividing unit 2 then divides the character string 111 into input words 112 to 115, and an output word 116.

The converting unit 3 then converts the input words 112 to 115 into the word classes of the respective input words 112 to 115, based on conversion probability information 110. In the same manner, the converting unit 3 converts the output word 116 into the word class of the output word 116 based on the conversion probability information 110. In this manner, the converting unit 3 converts the character string 111 into an input training word string 117 that includes input training words each of which indicates the input word or the word class of the input word, and into an output training word that indicates an output word or one word class of the output word. In the example of the input training word string 117 illustrated in FIG. 4, the input word 114 has been converted into a word class "MEISHI" which means "noun" in English.

The conversion probability information 110 stores therein a word, a word class, and a probability in a manner associated with one another. In the example of the conversion probability information 110 illustrated in FIG. 4, the probability that the word "TENKI" which means "weather" in English is converted into a word class "MEISHI" which means "noun" in English is one percent, for example.

The calculating unit 4 inputs the input training word string 117 to the input layer 10 of the neural network 200, so as to acquire the score output from the corresponding unit in the output layer 40 of the neural network 200. In the example illustrated in FIG. 4, the calculating unit 4 acquires the score output from the unit corresponding to an output training word 118.

The training unit 5 trains the neural network 200 based on the difference between the expected score of the output training word 118 and the score output from the unit corresponding to the output training word 118. The neural network 200 may be trained in any way. For example, the training unit 5 may train the neural network 200 with backpropagation.

Training Method

An example of the training method according to the embodiment will now be explained.

Figure 5:
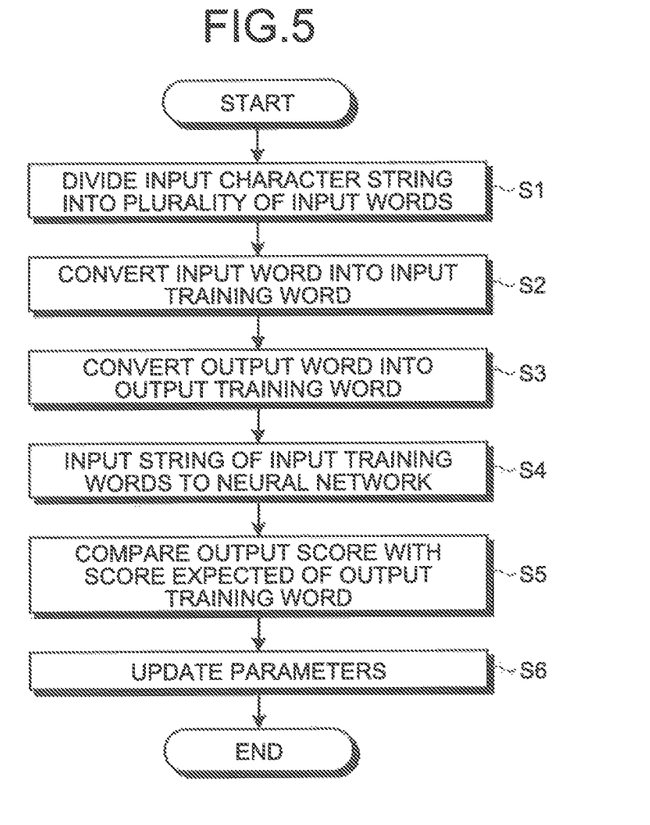
FIG. 5 is a flowchart illustrating an exemplary training method according to the embodiment.

FIG. 5 is a flowchart illustrating an exemplary training method according to the embodiment. To begin with, the dividing unit 2 divides an input character string, which is to be input to the input layer 10 of the neural network 200 that is to be trained, into a plurality of input words by performing the morphological analysis on the input character string (Step S1). Specifically, the dividing unit 2 acquires the character string used in training the neural network 200 from the training text corpus. The dividing unit 2 then divides the character string acquired from the training text corpus into an input character string (a plurality of input words) and an output word, by performing the morphological analysis on the character string. The output word is used in the process at Step S3.

The converting unit 3 then converts each of the input words into the word class of the input word based on the probability associated with the input word, so as to acquire an input training word indicating the input word or the word class of the input word (Step S2).

Then, when the input training word string including the input training words is input to the input layer 10, the converting unit 3 converts the output word expected to be output from the output, layer 40 of the neural network 200 into the word class of the output word based, on the probability associated with the output word, so as to acquire an output training word indicating the output word or the word, class of the output word (Step S3).

The calculating unit 4 then inputs the input training word string to the input layer 10 of the neural network 200, so as to acquire the score output from the corresponding unit in the output layer 40 of the neural network 200 (Step S4).

The training unit 5 then compares the expected score of the output training word with the score output from the unit corresponding to the output training word (Step S5). The training unit 5 then updates the parameters representing the neural network 200 based on the comparison result of the process at Step S5 (Step S6).

The training apparatus 100 trains the neural network 200 by repeating the process from Step S1 to Step S6 described above.

As explained above, in the training apparatus 100 according to the embodiment, the dividing unit 2 divides an input character string, which is to be input to the input layer 10 of the neural network 200 that is to be trained, into a plurality of input words. The converting unit 3 converts each of the input words into the word class of the input word based on the probability associated with the input word, so as to acquire an input training word indicating the input word or the word class of the input word. Then, when the input training word string including the input training words is input to the input layer 10, the converting unit 3 converts the output word expected to be output from the output layer 40 of the neural network 200 into the word class of the output word based on the probability associated with the output word, so as to acquire an output training word indicating the output word or the word class of the output word. The calculating unit 4 then inputs the input training word string to the input layer 10 of the neural network 200, so as to acquire the score output from the corresponding unit in the output layer 40 of the neural network 200. The training unit 5 then trains the neural network 200 based on the difference between the expected score of the output training word and the score output from the unit corresponding to the output training word.

In this manner, the training apparatus 100 according to the embodiment is enabled to train the neural network 200 for calculating the word score of a new word that is not yet known. For example, the training apparatus 100 according to the embodiment can train the neural network 200 that calculates the score of a new word not registered in the known-word dictionary, even after the neural network 200 has been trained with the known-word dictionary.

First Modification of Embodiment

A first modification of the embodiment will now be explained. In the explanation of the first modification, explanations that are the same as chose in the embodiment will be omitted, and parts that are different from those in the embodiment will be explained.

Because the functional configuration of the training apparatus 100 according to the first modification is the same as the exemplary functional configuration of the training apparatus 100 according to the embodiment (see FIG. 1), the explanation thereof will be omitted. Used in explaining the first modification is an example in which the vocabulary feature is a word class.

In the first modification, the neural network 200 that is to be trained has a different structure from that of the neural network 200 according to the embodiment (see FIG. 3). Specifically, the first modification is different from the embodiment described above in that the output layer 40 of the neural network 200 has no word-class score unit group 42.

Structure of Neural Network

Figure 6:
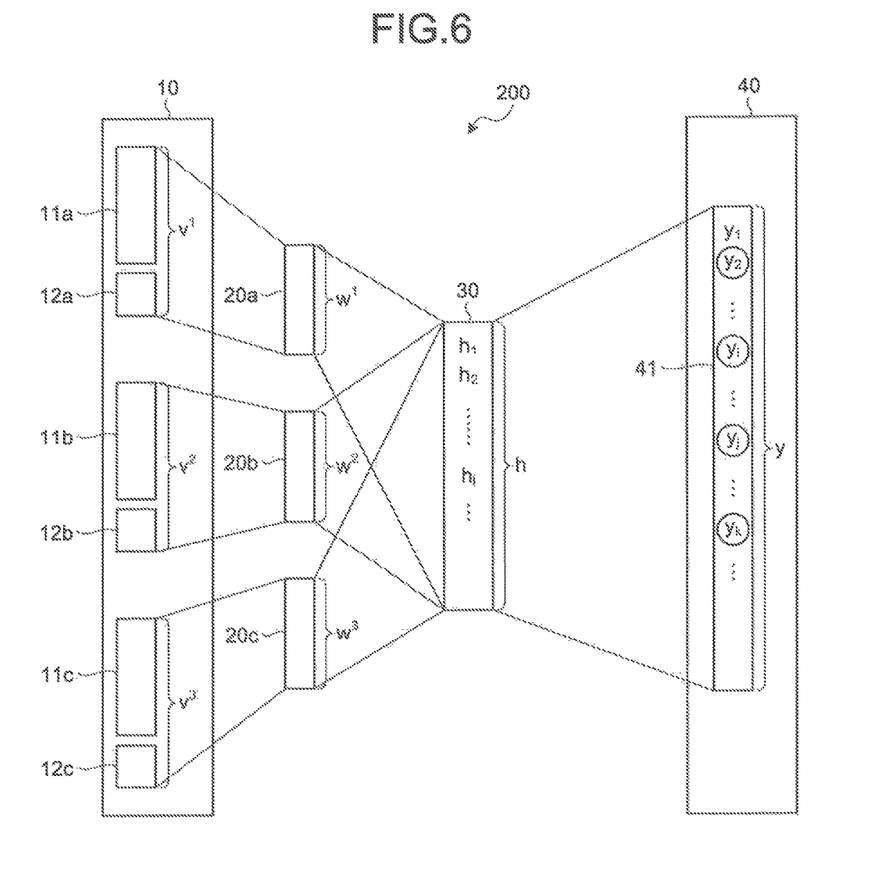
FIG. 6 is a schematic illustrating an exemplary neural network according to a first modification of the embodiment.

FIG. 6 is a schematic illustrating an example of the neural network 200 according to the first modification. Illustrated in FIG. 6 is an example in which the output layer 40 has a unit configured to output, a score of an output word but has no unit, configured to output a score of a word class.

The neural network 200 according to the first modification includes the input layer 10, the intermediate layers 20a to 20c, the intermediate layer 30, and the output layer 40. Because the explanations of the input layer 10, the intermediate layers 20a to 20c, and the intermediate layer 30 according to the first modification is the same as that in the embodiment, explanations thereof will be omitted.

The output layer 40 has the word score unit group 41, The word score unit group 41 represents a score of a word. The word score unit group 41 includes one or more word score units. Each of the word score units represents a score of a word that is already known (known word).

In the neural network 200 according to the first modification, the output layer 40 has no word-class score unit group 42. For this reason, parameters of the neural network 200 can be reduced compared with those in the embodiment described above. In other words, in the first modification, the storage capacity of the neural network 200 stored in the storage unit 1 can be reduced.

Usage Example of Neural Network

By using the neural network 200 described above, the calculating unit 4 can calculate the word score of the target word, even when a new word is included in the word string. Specifically, when the target word is a new word, the calculating unit 4 calculates the word score of the new word, based on all or some of the scores of the known words having a word class that matches the word class of the target new word, among those included in the word score unit group 41. For example, when the target word is a new word, the calculating unit 4 calculates the sum of all or some of the scores of the known words having a word class that matches the word class of the target new word, among those included in the word score unit group 41, as the word score of the new word.

Illustrated in FIG. 6 is an example in which the new word that is the target word has a matching word class as those of the known words corresponding to the scores of the known words represented by the components $y_2$, $y_i$, $y_j$, and $y_k$ of the vector y. In this example, when the target word is a new word, the calculating unit 4 calculates the sum of the scores of the known words represented by $y_2$, $y_i$, $y_j$, and $y_k$ and as the word score of the new word.

Training of Neural Network

In the first modification, the output layer 40 of the neural network 200 has no word-class score unit group 42. Therefore, the neural network 200 according to the first modification does not have the parameters representing the units for outputting scores of word classes.

Therefore, the converging unit according to the first modification sets the probability that the output word expected to be output from the output layer 40 of the neural network 200 is converted into the word class of the output word to 0. In this manner, in the first modification, because no output word is converted into the word class of the output word, the output training word always matches the output word described above.

With the training apparatus 100 according to the first modification, the same advantageous effects as those achieved by the embodiment described above can be achieved, even when the output layer 40 has a unit configured to output the score of an output word, but has no unit configured to output the score of a word class.

Second Modification of Embodiment

A second modification of the embodiment will now be explained. In the explanation, of the second modification, explanations that are the same as those in the embodiment will be omitted, and parts that are different from those in the embodiment will be explained.

Because the functional configuration of the training apparatus 100 according to the second modification is the same as that of the exemplary functional configuration of the training apparatus 100 according to the embodiment (see FIG. 1), the explanation thereof will be omitted. Used in explaining the second modification is an example in which the vocabulary feature is a word class.

In the second modification, the neural network 200 that is to be trained has a structure that is different from, that of the neural network 200 according to the embodiment (see FIG. 3). Specifically, the neural network 200 according to the second modification includes a first neural network and a second neural network that are structurally separated into two.

Structure of Neural Network

Figure 7:
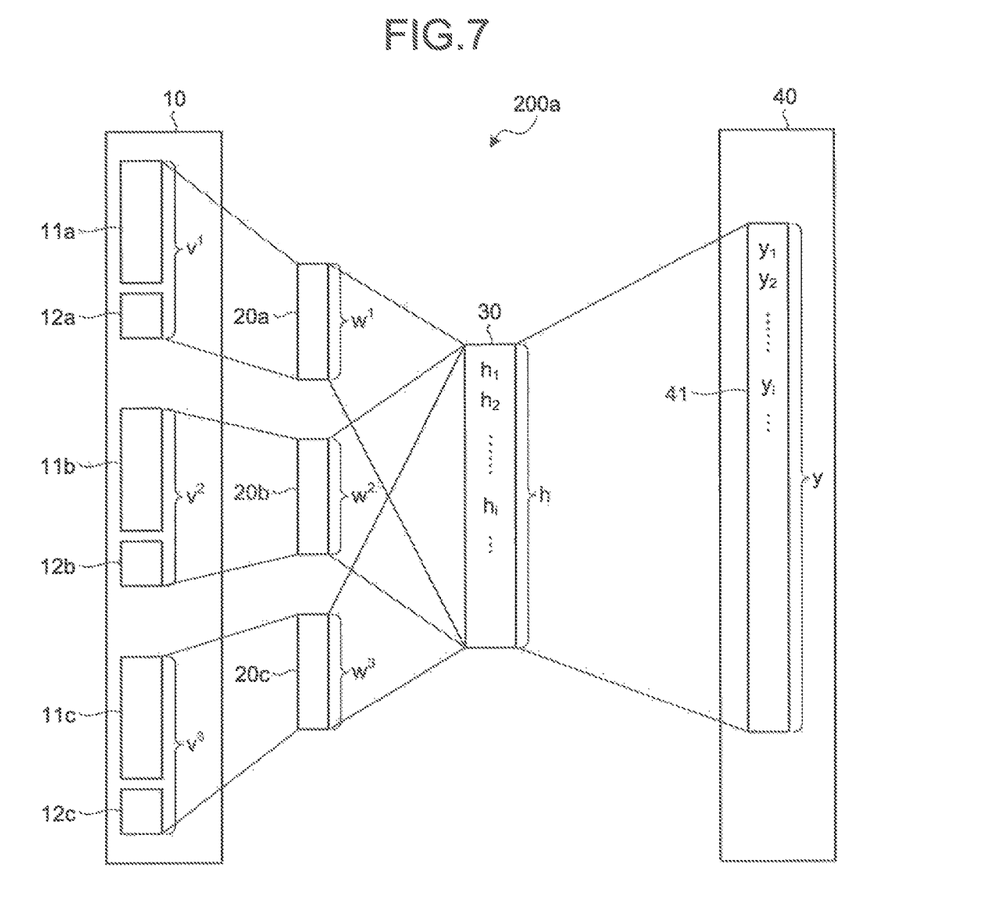
FIG. 7 is a schematic illustrating an exemplary first neural network according to a second modification of the embodiment.

FIG. 7 is a schematic illustrating an exemplary first neural network 200a according to the second modification. In the example illustrated in FIG. 7, the output layer 40 has the unit configured to output the score of an output word, but has no unit configured to output the score of a word class.

The first neural network 200a according to the second modification includes the input layer 10, the intermediate layers 20a to 20c, the intermediate layer 30, and the output layer 40. Because the explanations of the input layer 10, the intermediate layers 20a to 20c, and the intermediate layer 30 in the first neural network 200a according to the second modification are the same as those of the neural network 200 according to the embodiment, explanations thereof will be omitted.

The output layer 40 has the word score unit group 41. The word score unit group 41 includes one or more word score units. Each of the word score units represents the score of a word that is already known (known word).

Figure 8:
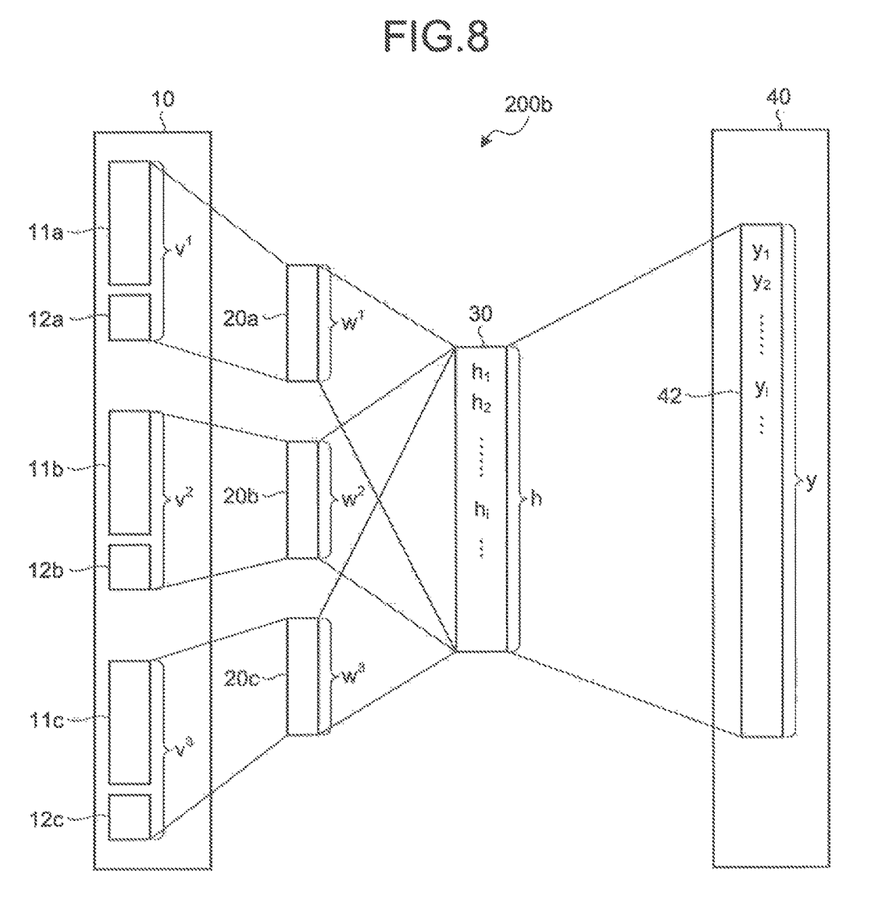
FIG. 8 is a schematic illustrating an exemplary second neural network according to the second modification of the embodiment.

FIG. 8 is a schematic illustrating an exemplary second neural network 200b according to the second modification. In the example illustrated in FIG. 8, the output layer 40 has no unit configured to output the score of an output word, but has the unit configured to output the score of a word class.

The second neural network 200b according to the second modification includes the input layer 10, the intermediate layers 20a to 20c, the intermediate layer 30, and the output, layer 40. Because the explanations of the input layer 10, the intermediate layers 20a to 20c, and the intermediate layer 30 in the second neural network 200b according to the second modification are the same as those in the neural network 200 according to the embodiment, explanations thereof will be omitted.

The output layer 40 has the word-class score unit group 42. The word-class score unit group 42 includes one or more word-class score units. Each of the word-class score units represents the score of a word class. Examples of the word class include verb, noun, and adjective.

In other words, in the second modification of the embodiment, the first neural network 200a for calculating the score of a word and the second neural network 200b for calculating the score of a word class can be provided with structures suitable for their respective score calculations.

Usage Example of Neural Networks

By using the first neural network 200a and the second neural network 200b described above, the calculating unit 4 can calculate the word score of the target word, even when a new word is included in a word string. Specifically, when the target word is a new word, the calculating unit 4 calculates the score in the word-class score unit group 42 in the second neural network 200b as the word score of the target word. When the target word is not a new word, the calculating unit 4 calculates the score in the word score unit group 41 in the first neural network 200a, as the word score of the target word.

Training of First Neural Network

In the first neural, network 200a according to the second modification, the output layer 40 has no word-class score unit group 42. Therefore, the first neural, network 200a according to the second modification has no parameters representing the unit configured to output the score of a word class, in the same manner as in the first modification described above. Because the training method of the first neural network 200a is the same as that according to the first modification, the explanation thereof will be omitted.

In the training of the first neural network 200a according to the second modification, no output word is converted into the word class of the output word, and therefore, the output training word always matches the output word described above.

Training of Second Neural Network

In the second neural network 200b according to the second modification, the output layer 40 does not have the word score unit group 41. Therefore, the second neural, network 200b according to the second modification has no parameters representing the unit configured to output the score of a word that is already known (known word).

Therefore, the converting unit 3 according to the second modification sets the probability that the output word expected to be output from the output layer 40 of the second neural network 200b is converted, into the word class of the output word to 1. In this manner, in the training of the second neural network 200*b* according to the second modification, the output word is always converted into the word class of the output word, and therefore, the output training word always matches the word class of the output word described above.

With the training apparatus 100 according to the second modification, the same advantageous effects as those achieved by the embodiment described above can be achieved, even when the output layer 40 has the units for outputting the score of an output word, but has no unit: configured to output the score of a word class (see FIG. 7). Furthermore, with the training apparatus 100 according to the second modification, the same advantageous effects as those achieved by the embodiment described above can be achieved, even when the output layer 40 has no unit configured to output the score of an output word, but has the unit configured to output the score of a word class (see FIG. 8).

Third Modification of Embodiment

A third modification of the embodiment will now be explained. In the explanation of the third modification, explanations that are the same as those in the embodiment will be omitted, and parts that are different from those in the embodiment will be explained.

Because the functional configuration of the training apparatus 100 according to the third modification is the same as that of the exemplary functional configuration of the training apparatus 100 according to the embodiment (see FIG. 1), the explanation thereof will be omitted. Used in explaining the third modification is an example in which the vocabulary feature is a word class.

In the third modification, the neural network 200 that is to be trained has a structure that is different from that of the neural network 200 according to the embodiment (see FIG. 3). Specifically, the third modification is different from the embodiment described above in that the input layer 10 of the neural network 200 does not have the word unit groups 11, and that the output layer 40 of the neural network 200 does not have the word score unit group 41.

Structure of Neural Network

Figure 9:
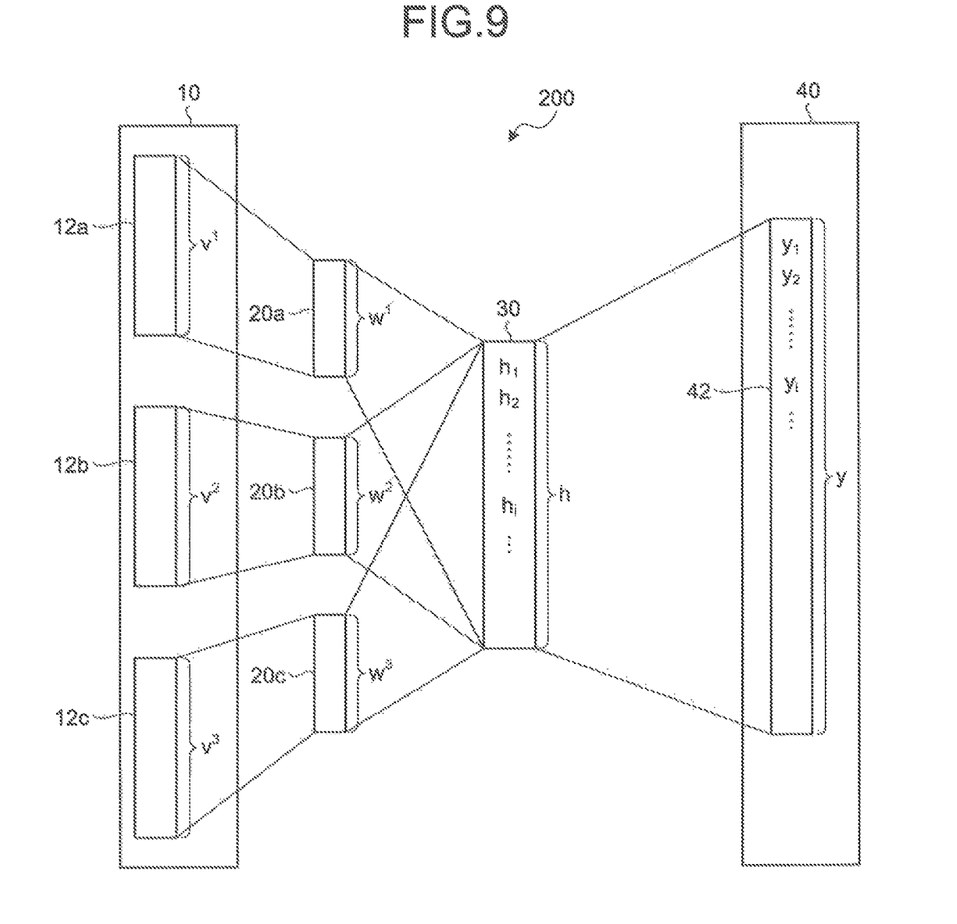
FIG. 9 is a schematic illustrating an exemplary neural network according to a third modification of the embodiment.

FIG. 9 is a schematic illustrating an example of a neural network 200 according to the third modification. The neural network 200 according to the third modification includes the input layer 10, the intermediate layers 20*a* to 20*c*, the intermediate layer 30, and the output layer 40.

The input layer 10 has the word-class unit groups 12*a* to 12*c*. The word-class unit group 12 includes one or more word-class units.

Because explanations of the intermediate layers 20*a* to 20*c* and the intermediate layer 30 according to the third modification are the same as those of the intermediate layers 20*a* to 20*c* and the intermediate layer 30 according to the embodiment, explanations thereof will be omitted.

The output layer 40 has the word-class score unit group 42. The word-class score unit group 42 includes one or more word-class score units. Each of the word-class score units represents the score of a word class. Examples of the word class include verb, noun, and adjective.

In the third modification, the input layer 10 of the neural network 200 does not have the word unit groups 11, and the output layer 40 of the neural network 200 does not have the word score unit group 41. Therefore, in the third modification, parameters of the neural network 200 can be reduced, compared with the embodiment described above. In other words, in the third modification, the storage capacity of the neural network 200 stored in the storage unit 1 can be reduced.

Furthermore, in the third modification, because the information input to the input layer 10 is a word class, and the information output from the output layer 40 is a word class score, one information handled in the neural network 200 can be specialized to the word class. Therefore, the training apparatus 100 according to the third modification can perform statistical training of the neural network 200 advantageously.

Usage Example of Neural Network

By using the neural network 200 described above, the calculating unit 4 can calculate the word score of a target, word, even when, a new word is included in the word string. Specifically, the calculating unit 4 inputs information to the input layer 10 based on three words preceding the target word. The calculating unit 4 inputs the word class of the first word previous to the target word to the word-class unit group 12*a*. The calculating unit 4 then inputs the word, class of the second word previous to the target word to the word-class unit group 12*b*. The calculating unit 4 then inputs the word, class of the third word previous to the target word to the word-class unit group 12*c*. The calculating unit 4 then calculates the score of the word-class score unit group 42 in the output layer 40 as the word score of the target word.

Training of Neural Network

In the third modification, the input layer 10 of the neural network 200 has no word unit group 11. Therefore, the neural network 200 according to the third modification has no parameters representing the unit to which a word is input.

Therefore, the converting unit 3 according to the third modification sets 1 as the probability that the input word input to the input layer 10 of the neural network 200 is converted into the word class of the input word. In this manner, an input word is always converted into the word class of the input word in the training of the neural network 200 according to the third modification. For this reason, the input training word described above always matches the word class of the input word described above.

Furthermore, in the third modification, the output layer 40 of the neural network 200 has no word score unit group 41. Therefore, the neural network 200 according to the third modification has no parameters representing the unit configured to output the score of a word that is already known (known word), in the same manner as the second neural network 200*b* according to the second modification. Because the explanation of the training method of the neural network 200 is the same as that of the second neural network 200*b* according to the second modification, explanations thereof will be omitted.

In the training of the neural network 200 according to the third modification, the output, word is always converted into the word class of the output word. For this reason, the output training word described above always matches the word class of the output word described above.

With the training apparatus 100 according to the third modification, the same advantageous effects as those achieved by the embodiment described above can be achieved, in the case where the input layer 10 has no unit to which any input, word is input but has the unit to which, a word class is input, and in the case where the output layer 40 has no unit that outputs the score of an output word but has the unit that outputs the score of a word class.

As explained above, the training apparatus 100 according to the embodiment can be used in training the neural network 200 with various structures. Explained above are some embodiments using the neural, network 200 that is to be trained, but these embodiments are presented by way of example only, and are not intended to limit the scope of the present invention in any way. The neural network 200 described above can be implemented in various other forms, and various omissions, substitutions, and changes may be made without departing from the spirit of the present invention.

The probabilities used by the converting unit 3 when the structure of the input layer 10 or the output layer 40 of the neural network 200 is simplified can be summarized as below.

(1) When the input layer 10 of the neural network 200 has no unit to which any input word is input, but has the unit to which a vocabulary feature (for example, a word class) is input, the converting unit 3 sets the probability that the input word input to the input layer 10 is converted into the vocabulary feature of the input word to 1.

(2) When the input layer 10 of the neural network 200 has the unit to which an input word is input, but has no unit to which any vocabulary feature is input, the converting unit 3 sets the probability that the input word input to the input layer 10 is converted into the vocabulary feature of the input word to 0.

(3) When the output layer 40 of the neural network 200 has no unit that outputs the score of an output word, but has the unit that outputs the score of the vocabulary feature, the converting unit 3 sets the probability that the output word expected to be output from the output layer 40 is converted into the word class of the output word to 1.

(4) When the output layer 40 of the neural network 200 has the unit that outputs the score of the output word, but has no unit that outputs the score of the vocabulary feature, the converting unit 3 sets 0 as the probability that the output word expected to be output from the output layer 40 is converted, into the word, class of the output word.

Hardware Configuration of Training Apparatus

Finally, an exemplary hardware configuration of the training apparatus 100 according to the embodiment will be explained.

Figure 10:
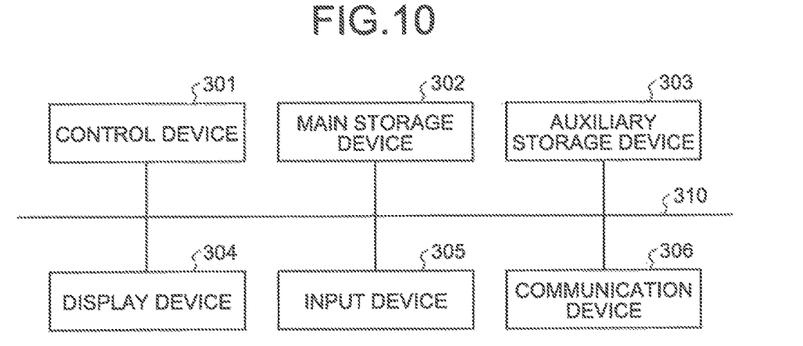
FIG. 10 is a schematic illustrating an exemplary hardware configuration of a training apparatus according to the embodiment.

FIG. 13 is a schematic illustrating an exemplary hardware configuration of the training apparatus 100 according to the embodiment. The training apparatus 100 according to the embodiment includes a control device 301, a main storage device 302, an auxiliary storage device 303, a display device 304, an input device 305, and a communication device 306. The control device 301, the main storage device 302, the auxiliary storage device 303, the display device 304, the input device 305 and the communication device 306 are connected to one another through a bus 310.

The control device 301 executes a computer program read from the auxiliary storage device 303 onto the main storage device 302. Examples of the main storage device 302 include memories such as a read-only memory (ROM) and a random, access memory (RAM). Examples of the auxiliary storage device 303 include a memory card and a solid-state drive (SSD).

The display device 304 displays information. An example of the display device 304 includes a liquid crystal display. The input device 305 receives inputs of information. Examples of the input, device 305 include a keyboard and a mouse. The display device 304 and the input device 305 may be a liquid-crystal touch panel having both of a display function and an input function. The communication device 306 exchanges information with other devices.

The computer program executed on the training apparatus 100 according to the embodiment is provided as a computer program product stored in a computer-readable storage memory such as a compact disc read-only memory (CD-ROM), a memory card, a compact disc recordable (CD-R), and a digital versatile disc (DVD), as a file in an installable or executable format.

Furthermore, the computer program executed by the training apparatus 100 according to the embodiment may be provided by storing the computer program in a computer connected to a network such as the Internet, and made available for download over the network. The computer program executed by the training apparatus 100 according to the embodiment may be provided over a network, without permitting the computer program to be downloaded.

Furthermore, the computer program executed by the training apparatus 100 according to the embodiment may be provided incorporated in a ROM or the like in advance.

The computer program executed by the training apparatus 100 according to the embodiment has a modular structure including functions that can be implemented by the computer program, among those in the functional configuration of the training apparatus 100 according to the embodiment. The functions implemented by the computer program are loaded onto the main storage device 302 by causing the control device 301 to read the computer program from a storage medium such as the auxiliary storage device 303, and executing the computer program. In other words, the functions implemented by the computer program are generated on the main storage device 302.

Some part of or the entire functions of the training apparatus 100 according to the embodiment may be implemented using hardware such an integrated circuit (IC).

The conventional technology, however, has been incapable of training a neural network that can calculate a word score of a new word that is not yet known.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A training apparatus comprising:
   a memory; and
   one or more hardware processors communicatively coupled to the memory, the hardware processors configured to function as a dividing unit, a converting unit, a calculating unit, and a training unit, wherein:
   the dividing unit is configured to divide an input character string to be input to an input layer of a neural network to be trained into a plurality of input words,
   the converting unit is configured to:
     convert each of the input words into a vocabulary feature of the input word based on a first probability associated with the input word, to acquire an input training word indicating the input word or the vocabulary feature of the input word, and
     convert, when an input training word string including a plurality of input training words is input to the input layer, an output word expected to be output from an output layer of the neural network into a vocabulary feature of the output word based on a second probability associated with the output word, to acquire an output training word indicating the output word or the vocabulary feature of the output word, the calculating unit is configured to input the input training word string to the input layer of the neural network, to acquire a score output from a unit included in the output layer of the neural network, and the training unit is configured to train the neural network based on a difference between an expected score of the output training word and a score output from a unit corresponding to the output training word.

2. The training apparatus according to claim 1, wherein the vocabulary feature is a word class of a word.

3. The training apparatus according to claim 1, wherein the training unit trains the neural network with backpropagation.

4. The training apparatus according to claim 1, wherein the dividing unit acquires the input character string and the output word by dividing a character string used in training of the neural network.

5. The training apparatus according to claim 1, wherein when the input layer of the neural network has no unit to which any input word is input but has a unit to which a vocabulary feature is input, the converting unit sets the first probability to 1.

6. The training apparatus according to claim 1, wherein when the input layer of the neural network has a unit to which an input word is input but has no unit to which any vocabulary feature is input, the converting unit sets the first probability to 0.

7. The training apparatus according to claim 1, wherein when the output layer of the neural network has no unit that outputs the score of the output word, but has a unit that outputs the score of the vocabulary feature, the converting unit sets the second probability to 1.

8. The training apparatus according to claim 1, wherein when the output layer of the neural network has a unit that outputs the score of the output word but has no unit that outputs the score of the vocabulary feature, the converting unit sets the second probability to 0.

9. A training method comprising:

dividing an input character string to be input to an input layer of a neural network, to be trained into a plurality of input words;

converting each of the input words into a vocabulary feature of the input word based on a first probability associated with the input word, to acquire an input training word indicating the input word or the vocabulary feature of the input word;

converting, when an input training word string including a plurality of input training words is input to the input layer, an output word expected to be output from an output layer of the neural network into a vocabulary feature of the output word based on a second probability associated with the output word, to acquire an output training word indicating the output word or the vocabulary feature of the output word;

inputting the input training word string to the input layer of the neural network, to acquire a score output from a unit included in the output layer of the neural, network; and training the neural network based on a difference between an expected score of the output training word, and a score output from a unit corresponding to the output training word.

10. A computer program product comprising a non-transitory computer-readable medium including a computer program that causes a computer to operate as:

a dividing unit configured to divide an input character string to be input, to an input layer of a neural network to be trainee into a plurality of input words;

a converting unit configured to
convert each of the input words into a vocabulary feature of the input word based on a first probability-associated with the input word, to acquire an input training word indicating the input word or the vocabulary feature of the input word, and convert, when an input training word string including a plurality of input training words is input to the input layer, an output word expected to be output from an output layer of the neural network into a vocabulary feature of the output, word based on a second probability associated with the output word, to acquire an output training word indicating the output word or the vocabulary feature of the output word;

a calculating unit configured to input the input training word string to the input layer of the neural network, to acquire a score output from a unit included in the output layer of the neural network; and a training unit configured to train the neural network based on a difference between an expected score of the output training word and a score output from a unit corresponding to the output training word.

11. A training apparatus for a neural network using a text corpus, the apparatus comprising:

a memory; and one or more hardware processors communicatively coupled to the memory, the hardware processors configured to function as a dividing unit, a converting unit, a calculating unit, and a training unit, wherein:

the dividing unit is configured to divide an input character string to be input to an input layer of a neural network to be trained into a plurality of input words, the converting unit is configured to:
convert each of the input words into a vocabulary feature of the input word based on a first probability associated with the input word, to acquire an input training word indicating the input word or the vocabulary feature of the input word, and convert, when an input training word string including a plurality of input training words is input to the input layer, an output word expected to be output from an output layer of the neural network into a vocabulary feature of the output word based on a second probability associated with the output word, to acquire an output training word indicating the output word or the vocabulary feature of the output word, the calculating unit is configured to input the input training word string to the input layer of the neural network, to acquire a score output from a unit included in the output layer of the neural network, and the training unit is configured to train the neural network based on a difference between an expected score of the output training word and a score output from a unit corresponding to the output training word.

* * * * *